Sept. 20, 1960 R. W. GILBERT 2,953,747
ELECTRICAL INSTRUMENT
Original Filed Nov. 25, 1952 2 Sheets-Sheet 1
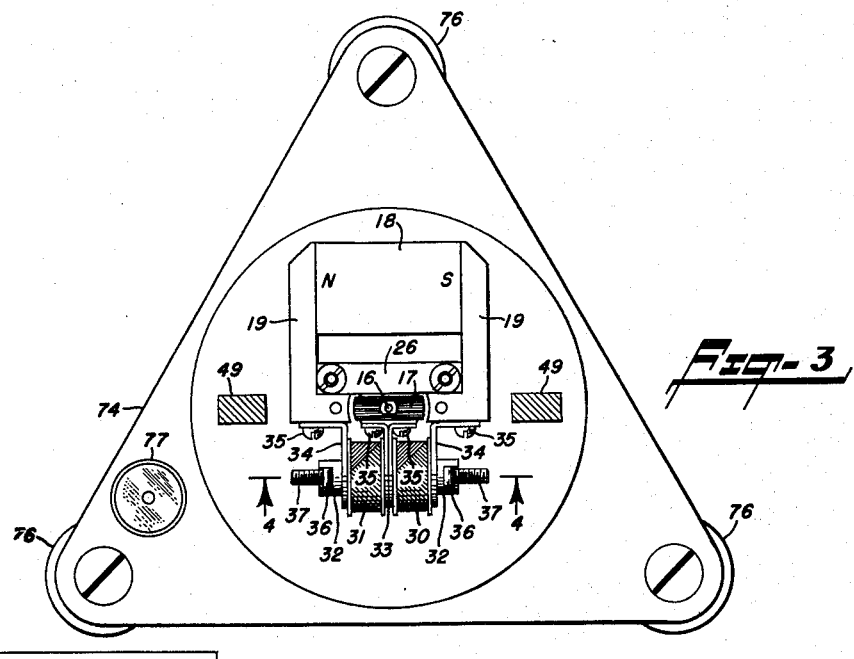
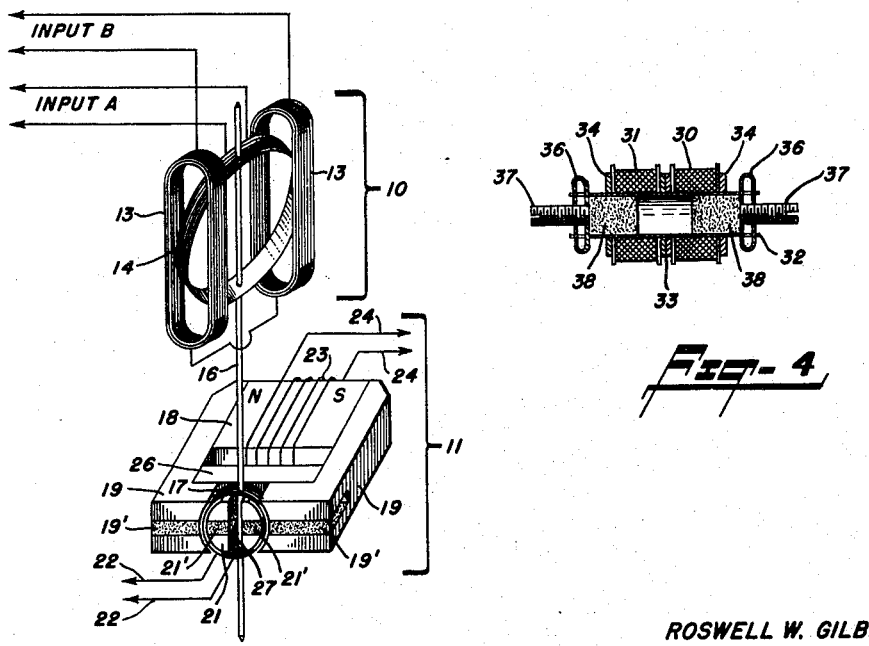
ROSWELL W. GILBERT
INVENTOR.
BY
Rudolph J. Jucick
ATTORNEY Sept. 20, 1960    R. W. GILBERT    2,953,747
ELECTRICAL INSTRUMENT
Original Filed Nov. 25, 1952    2 Sheets-Sheet 2

ROSWELL W. GILBERT
INVENTOR.

BY
Rudolph J. Jurick
ATTORNEY

United States Patent Office 2,953,747
Patented Sept. 20, 1960

2,953,747

ELECTRICAL INSTRUMENT

Roswell W. Gilbert, East Orange, N.J., assignor, by mesne assignments, to Daystrom, Incorporated, Murray Hill, N.J., a corporation of New Jersey Original application Nov. 25, 1952, Ser. No. 322,438. Divided and this application Jan. 16, 1958, Ser. No. 709,381

12 Claims. (Cl. 324—114)

This invention relates to an electrical instrument, and more particularly to an instrument comprising an electrodynamometer mechanism and converter mechanism mounted as a single movement.

The instrument of my invention is of particular use in an arrangement wherein a resultant torque produced by two primary elements separately responsive to the instantaneous state of two variable conditions is converted into a single electrical current that is a product function of the instantaneous states of both conditions. Such an arrangement is shown in my co-pending United States patent application Serial Number 322,438, filed November 25, 1952, and entitled Arrangement for Converting a Mechanical Torque to a D.-C. Current, now Patent No. 2,838,232; this application being a division of the above co-pending application. The entire arrangement described in the above-mentioned co-pending patent application includes position sensing and amplification functions whereby the mechanical torque produced by the electrodynamometer mechanism of my instrument, which torque is proportional to the instantaneous product of the individual currents flowing in the electrodynamometer field and movable coils, is balanced by the converter mechanism of the instrument, the balancing action being automatic by the use of the position sensing and amplification functions.

The converter mechanism of my novel electrical instrument comprises an induction galvanometer mechanism which is capable of position sensing within the region of a few seconds of angle and can be made to serve as a torque balance by applying the output current of the system to the movable coil of the induction galvanometer mechanism.

An object of this invention is the provision of an electrical instrument comprising a primary torque-producing element responsive to the instantaneous state of a variable condition, and an electro-mechanical device coupled thereto and adapted to balance the torque of the primary element.

An object of this invention is the provision of an electrical instrument comprising an electrodynamometer mechanism and an induction galvanometer mechanism mounted on a single shaft.

An object of this invention is the provision of an electrodynamometer measuring mechanism having field and movable coils, a shaft secured to the movable coil of the electrodynamometer; an induction galvanometer mechanism including a permanent magnet and associated pole pieces having spaced ends forming an air gap, an induction galvanometer movable coil secured to the staff and rotatable in the air gap of the said magnet structure, and a field coil supported on said magnet structure and adapted, when energized by an A.-C. current, to produce a varying magnetic flux field across the said air gap.

These and other objects and advantages will become apparent from the following description when taken with the accompanying drawings. It will be understood that the drawings are for purposes of illustration and are not to be construed as defining the scope or limits of the invention, reference being had for the latter purposes to the appended claims.

In the drawings wherein like reference characters denote like parts in the several views:

Figure 1 is a diagrammatic presentation of my novel electrical instrument;

Figure 3 is a horizontal sectional view taken on line 3—3 of Figure 2; and

Figure 4 is a sectional view of the converter element taken along the line 4—4 of Figure 3.

Figure 2:
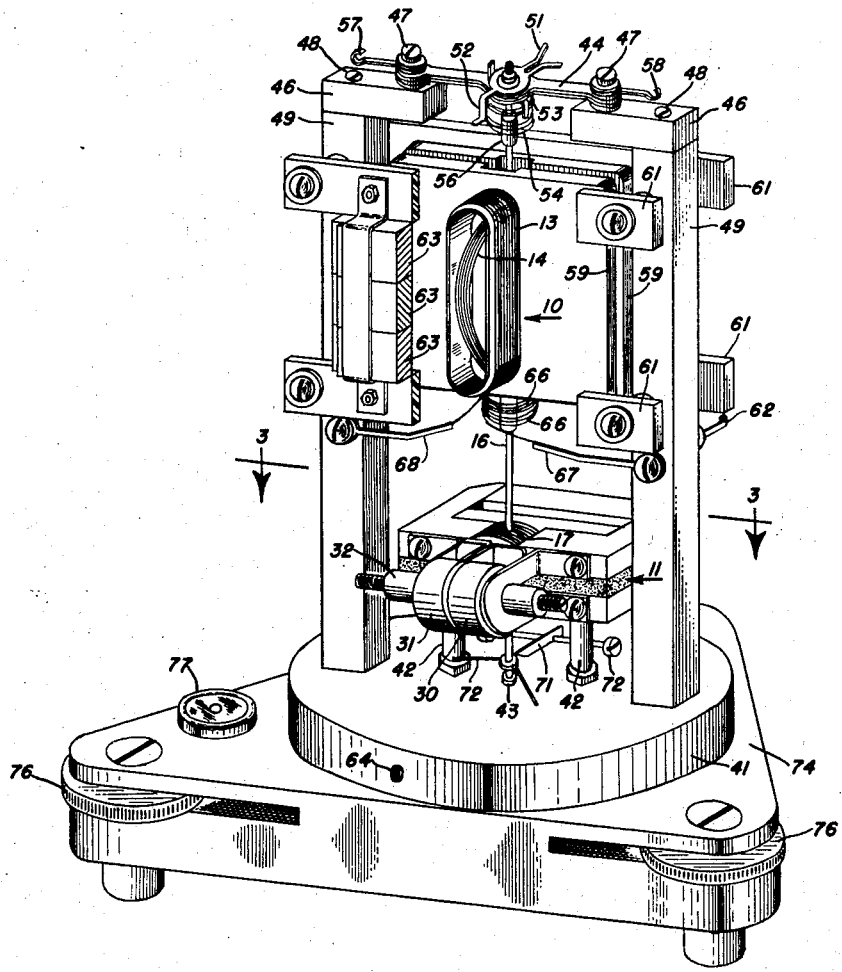
Figure 2 is an isometric view of my novel electrical instrument.

Reference is first made to Figure 1 of the drawings which is a diagrammatic view of my novel electrical instrument. The instrument comprises, generally, an electrodynamometer mechanism, designated 10, and a converter, or induction galvanometer, mechanism 11. The electrodynamometer mechanism 10 comprises field coils 13 and a movable coil 14, the latter being secured to a staff 16. It may be here pointed out that the electrodynamometer mechanism is generally similar to that used in conventional electrodynamometer indicating instruments, but in the present case, such mechanism affords two design advantages permitted by the negligible displacement angle of the moving coil. Specifically, the structure is designed for maximum differential coupling by flattening and compacting the field coils 13 about the movable coil 14, resulting in an efficiency gain of about 3 over a conventional deflection instrument of comparable size. Also, the electrodynamometer mechanism 10 operates at the point of zero mutual inductance thereby eliminating coupling difficulties as normally experienced in deflection instruments. As shown in the drawing, two input currents are fed to the movable coil and field coils, the respective input circuits being identified as Input A and Input B.

The converter mechanism 11 for deflection sensing and conversion to the torque for balance against the electrodynamometer torque comprises a D.-C. mechanism having its movable coil 17 secured to the common staff 16. This converter mechanism essentially is similar to the induction galvanometer device disclosed in my United States Patent Number 2,486,641, issued November 1, 1949, and entitled Measuring and Control Apparatus. Suffice to say, for present purposes, the induction galvanometer mechanism of my instrument comprises the permanent magnet 18 which establishes a unidirectional magnetic flux field between the pole pieces 19 and the core 21. In accordance with conventional instrument practice, current is brought to the movable coil 17 by means of conventional hair springs (not shown in Figure 1) through lead wires 22. The movable coil will rotate about the axis formed by the staff 16 in a direction and to an extent depending upon the magnitude of the D.-C. current flowing therein. A varying magnetic flux field is also provided across the movable coil air gap by means of a coil 23, here shown diagrammatically as encircling the magnet 18, said coil being energized by an appropriate high-frequency current source through lead wires 24. It is apparent, therefore, that the movable coil 17 rotates in a magnetic flux gap that includes the steady flux field of the permanent magnet 18 and the varying flux field produced by the coil 23. When the movable coil is in its normal, zero-center, position, as shown in the drawing, the A.-C. flux linkage is zero. However, deflection of the movable coil 17 causes such coil to link, proportionally, the A.-C. component of the flux field and an A.-C. potential is induced therein, such potential having a magnitude and phase proportional to the degree and direction of coil deflection. Thus, deflection of the movable coil 17, in response to the torque produced by the electrodynamometer mechanism 10, will produce an A.-C. current flow in the movable coil which can be extracted through leads 22 for amplification.

The developed A.-C. coil potential is directly proportional to the frequency of the current flowing in the coil 23 and the operational quality of the mechanism is proportional to increasing frequency until limited by some secondary consideration, such as losses in the field structure or the movable coil. The solid iron flux paths normally used in D.-C. instrument structures are not efficient for the high-frequency component of the magnetic flux and, conversely, the magnetic materials suitable for high frequencies have permeabilities insufficient for the relatively high level of steady flux of the permanent magnet. I, therefore, employ a composite magnetic structure disclosed in detail in my United States Patent Number 2,650,348, issued August 25, 1951, and entitled "Induction Galvanometer." Specifically, the pole pieces 19, made of soft iron, are provided with milled slots, and rectangular blocks 19', of carbonyl iron powder bonded and insulated by a resin, are cemented or otherwise bonded in the pole-piece slots. The core 21, made of soft iron and cemented, or brazed, to a bar 26 of non-magnetic material, is also provided with appropriate slots accommodating the powdered iron inserts 21'. As shown in the drawing, the core also includes a transverse vertical slot 27 through which the staff 16 passes. The non-magnetic bar 26 is secured to the pole pieces 19 whereby the core sections are spaced relative to the opposed pole pieces to provide the circular air gap for the coil 17. In order to provide as rapid a response as possible, the entire movable system of the device should be rigid, and toward this end I prefer to make the movable coil 17 round with the staff 16 passing therethrough, such construction avoiding compliance by coil distortion under torque. The powdered iron inserts 19' and 21' provide a path for the high frequency alternating magnetic flux, and the soft-iron pole pieces 19 and core 21 provide a path for the steady unidirectional flux of the permanent magnet 18.

The converter, or induction galvanometer, mechanism 11, serves to convert very small deflections of the staff 16 into a high frequency component of voltage which may be amplified, phase-rectified, and fed back into the movable coil 17 as a D.-C. current to torque balance the system; the amplifier and phase-rectifiers not being shown in the drawings since my invention is directed only to the instrument mechanism, per se. The torque produced by the electrodynamometer mechanism 10 is, thereby, automatically converted into a proportionate D.-C. output current, the said D.-C. output current being derived from the amplified and phase-rectified high frequency voltage component. As an element, the electrodynamometer is recognized as being precisely responsive to the product of the currents flowing in the movable and field coils so that with an effective torque balance, the D.-C. output current from the phase-rectifying means of the system is precisely related to the product of the two input currents.

In Figure 1 of the drawings, my novel electrical instrument is shown diagrammatically. Reference is now made to Figures 2–4 which show the actual construction of the instrument, Figure 2 being an isometric view, and Figures 3 and 4 being sectional views taken along lines 3—3 and 4—4 of Figures 2 and 3, respectively. As seen in Figures 2–4, the high-frequency field coil designated 23 in the diagrammatic presentation of Figure 1, includes a pair of multiturn coils 30, 31, on a tube 32 of insulating material which is supported upon the magnetic field structure by brass, L-shaped brackets 33, 34 having their ends respectively secured to the pole pieces 19 and the core 21 by the screws 35. Centrally apertured spring clips 36 are resiliently retained upon the ends of the insulating tube 32 to form nuts through which are threaded screws 37 upon which short cylinders 38 of powdered iron in a resin binder are molded. The spring clamping arms of the spring clips 36 are located in notches at the ends of the tube 32 to prevent inadvertent rotation of the spring clips when the screws 37 are turned to adjust the powdered iron cylinders 38. Individual adjustment of the cylinders 38 alters the effective inductance of the coils 30, 31 and thereby tunes them to resonance at the desired operating frequency. For a more detailed description of the structural features of the converter mechanism 11, reference is made to my United States Patent Number 2,650,348, above mentioned.

As best seen in Figure 2 of the drawings, the converter mechanism 11 is supported from a base 41 by the studs 42, the base carrying a jewel screw 43 that serves as the lower bearing for the staff 16 to which the movable coil 17 is secured. The upper bearing for the staff 16 is carried by a double bridge 44 that is secured to the arms 46 by the screws 47, said arms being secured by screws 48 to upright members, or posts, 49 made of non-magnetic material, such as brass. Those skilled in this art will understand that the bridge 44 comprises two cross members electrically insulated from each other and from the arms 46 by a conventional arrangement of insulating tubes, washers and strips and that each of the two abutments 51, 52 is in electrical contact only with one of such members. In accordance with conventional practice, each of the filamentary hair springs 53, 54 has an outer end soldered to one of the abutments and an inner end soldered to suitable terminals carried by an insulator tube 56 that is secured to the staff 16. The ends of the electrodynamometer movable coil 14 are soldered to such terminals, the entire assembly being such that current is conducted to the movable coil by leads attached to the terminals 57, 58. The field coils 13 are positionally supported by insulator plates 59 which are, in turn, secured to the upright posts 49, through insulating members 61 (shown broken away for clarity). Suitable terminals, such as terminal 62, visible in Figure 2, are secured to the posts 49 but insulated therefrom and serve as a means for connecting the field coils into an external circuit. Since the movable coil 14 is subjected to only a negligible displacement angle the electrodynamometer mechanism is designed for maximum differential coupling by flattening and compatcing the field coils about the movable coil, as mentioned above. The electrodynamometer mechanism operates at the point of zero inductance, thereby eliminating coupling errors as normally experienced in deflection instruments. It will also here be noted that the movable coils of the electrodynamometer and converter mechanisms are positioned at right angles to each other to reduce any magnetic cross coupling. Magnetic shielding of the electrodynamometer mechanism is accomplished to a practical extent by the rectangular shields 63 made of ferrite (the ferrite shields being shown broken away for clarity in Figure 2). Further shielding of the entire device may be provided by a cup-shaped cover (not shown) adapted to enclose the device and having ends secured to the circular base 41 by suitable screws threaded into holes 64.

Current is fed to the movable coil of the converter, or induction galvanometer, mechanism through the hair springs 66 which are similar to the electrodynamometer springs 53, 54 and which have outer ends soldered to the free ends of the metal strips 67, 68. The other ends of the metallic strips 67, 68 are insulatedly secured to the upright posts 49. As mentioned above, I prefer to make the movable coil 17 of the converter mechanism round rather than rectangular, with the shaft 16 passing therethrough. In this way, I avoid coil compliance by coil distortion under torque. The A.-C. field coils 30, 31 of the converter mechanism, have been described above. Secured at the lower end of the shaft 16 is an arm 71 movable within a range defined by the adjustable stops 72 that are carried by the base 41. The purpose of this arrangement is to limit the maximum deflection of the movable system.

Since the instrument is subject to position error and vibration, it should be located properly and leveled. Toward the latter end I mount the device on a triangular platform 74 provided with conventional thumb-operable members 76 each individually adjustable to level the platform as indicated by a small spirit level 77 that is secured to the platform surface.

Having now described my invention in detail, in accordance with the patent statutes, various changes and modifications will suggest themselves to those skilled in this art, and it is intended that changes and modifications shall fall within the spirit and scope of the invention as recited in the following claims.

I claim:

1. An electrical instrument comprising an induction galvanometer of the type including a magnetic field structure having spaced polar surfaces between which a unidirectional magnetic flux is established, a movable coil supported for angular displacement in the gap between said polar surfaces in response to direct current traversing said coil, and means for superposing a high frequency alternating magnetic flux upon the unidirectional magnetic flux traversing said interpole gap; an electrodynamometer mechanism of the type including a movable coil supported for angular displacement between a pair of field coils; and a pivotal staff, the said induction galvanometer and electrodynamometer movable coils each being secured to the said staff.

2. The invention as recited in claim 1 wherein the said two movable coils lie in perpendicular planes.

3. The invention as recited in claim 1 wherein the said field coils are of an elongated and flattened shape, the said electrodynamometer movable coil being movable through only a small angular displacement about the normal zero center position.

4. An electrical instrument comprising an induction glavanometer of the type including a permanent magnet structure having spaced poles, a movable coil supported for angular displacement in the gap betweeen said poles in response to direct current traversing the coil, and means for superposing a periodically varying magnetic field upon the steady magnetic field of said permanent magnet structure, said coil being normally in a position of zero mutual coupling to the periodically varying magnetic field; an electrodynamometer of the type including a pair of spaced field coils, a movable coil normally disposed in a position of zero mutual inductance with respect to the said pair of field coils; aand a pivotally mounted staff having the said induction galvanometer and electrodynamometer movable coils secured thereto.

5. The invention as recited in claim 4 wherein the said two movable coils lie in perpendicular planes and the said staff passes through each coil.

6. The invention as recited in claim 4 wherein the said field coils are of an elongated and flattened shape and each including a pair of substantially parallel long leg portions, the said electrodynamometer movable coil being positioned within the said pair of field coils.

7. An instrument mechanism comprising a permanent magnet and associated pole pieces having spaced ends forming an air gap, a staff, a first movable coil secured to the staff and rotatable in the air gap of the said magnet structure, a field coil supported on said magnet structure and adapted, when energized by an A.-C. current, to produce a varying magnetic flux field across the said air gap, a pair of field coils, a second movable coil secured to the said staff and normally disposed in a position of zero mutual inductance with respect to the said pair of field coils.

8. The invention as recited in claim 7 wherein the said two movable coils lie in perpendicular planes.

9. The invention as recited in claim 7 wherein the said field coils are of an elongated and flattened shape, the said second movable coil being positioned within the said pair of field coils and adapted for rotation through only a small angular displacement.

10. An instrument mechanism comprising a base; a pair of posts secured to the base and extending upwardly therefrom in parallel, spaced relation; a magnetic structure secured to the base, said structure including a permanent magnet and associated pole pieces having spaced ends forming an air gap; bearings carried by the base and a bridge spanning the ends of said posts; a staff pivotally mounted between the bearings; a first movable coil secured to the staff and rotatable in the air gap of the said magnet structure, a field coil supported on said magnet structure and adapted, when energized by an A.-C. current, to produce a varying magnetic flux field across the said air gap; a pair of field coils; means supporting the said field coils in spaced relationship from the said posts; and a second movable coil secured to said staff and normally disposed in a position of zero mutual inductance with respect to the said pair of field coils.

11. The invention as recited in claim 10 wherein the said two movable coils lie in perpendicular planes and the said staff passes through each roll.

12. The invention as recited in claim 10 wherein the said field coils are of an elongated and flattened shape, the said second movable coil being within the said pair of field coils and adapted for movement about the normal zero mutual inductance position through only a small angular displacement.

References Cited in the file of this patent

UNITED STATES PATENTS

| | | |
|---|---|---|
| 2,486,641 | Gilbert | Nov. 1, 1949 |
| 2,510,733 | Wolferz | June 6, 1950 |
| 2,596,297 | Shotter | May 13, 1952 |
| 2,778,998 | Harris | Jan. 22, 1957 |